United States Patent [19]

Oishi et al.

[11] 4,187,340
[45] Feb. 5, 1980

[54] METHOD OF FORMING PATTERNED TRANSPARENT ELECTRO-CONDUCTIVE FILM ON THE SUBSTRATE OF LIQUID CRYSTAL DISPLAY

[75] Inventors: Rokuji Oishi; Yasuharu Okajima; Satoshi Noguchi, all of Yokohama; Kazuyuki Akeyoshi, Yamato, all of Japan

[73] Assignee: Asahi Glass Company, Ltd., Tokyo, Japan

[21] Appl. No.: 569,000

[22] Filed: Apr. 17, 1975

Related U.S. Application Data

[63] Continuation of Ser. No. 359,641, May 14, 1973, abandoned.

[51] Int. Cl.$^2$ .......................... B32B 3/10; B32B 17/06
[52] U.S. Cl. ........................... 428/210; 427/108; 427/126; 427/259; 427/264; 427/266; 427/272; 428/1; 428/195; 428/432
[58] Field of Search ................ 350/160 LC; 252/299, 252/408 LC; 428/1, 210; 23/230 LC; 427/108, 109, 126, 259, 264, 266, 272

[56] References Cited

U.S. PATENT DOCUMENTS

| | | | |
|---|---|---|---|
| 2,522,531 | 9/1950 | Mochel | 427/109 |
| 2,910,766 | 11/1959 | Pritkin | 117/212 |
| 2,932,590 | 4/1960 | Barrett et al. | 427/109 |
| 2,971,867 | 2/1961 | Lytle | 117/212 |
| 3,039,896 | 6/1962 | VanCakenberghe et al. | 117/212 |

*Primary Examiner*—Marion E. McCamish
*Assistant Examiner*—P. Thibodeau
*Attorney, Agent, or Firm*—Oblon, Fisher, Spivak, McClelland & Maier

[57] ABSTRACT

A paste comprising particles of an inorganic oxide and a vehicle is printed on portions of a substrate which are not to be coated with a transparent electro-conductive film. A low valence oxide film of an electro-conductive metal oxide is deposited on the printed substrate by a vacuum deposition process. The resulting substrate is heated in an atmosphere containing oxygen, whereby the film is oxidized to form a transparent, highly electro-conductive film and the vehicle present in the paste is decomposed to yield a patterned, transparent electro-conductive film on the substrate.

3 Claims, No Drawings

METHOD OF FORMING PATTERNED TRANSPARENT ELECTRO-CONDUCTIVE FILM ON THE SUBSTRATE OF LIQUID CRYSTAL DISPLAY

This is a continuation, of application Ser. No. 359,641, filed May 14, 1973 now abandoned.

BACKGROUND OF THE INVENTION

1. Field of the Invention

This invention relates to a method of forming a patterned transparent electro-conductive film on a substrate. More particularly, it relates to a method of forming a transparent electro-conductive film possessing stable, low electrical resistivity in precise patterns on a substrate. The substrate coated with the film can be effectively used in liquid crystal displays.

2. Description of the Prior Art

Transparent electrode plates prepared by depositing transparent electro-conductive films in desired patterns on substrates such as glass plates have been used for liquid crystal displays. It has been required of the patterned electro-conductive films that they be chemically inert, mechanically firm, have low electrical resistivity, have high transmittance and the ability to form precise patterns. Heretofore, transparent electrode plates have been prepared by forming a predetermined pattern on a substrate by photo-etching after depositing a transparent electro-conductive film on the substrate. The conventional methods of forming the electrode plates have been complicated because of the sophisticated apparatus required and the labor involved, both of which limit the productivity of the electrode plates. Thus, the production efficiency has been low, because of the many steps involved and the expense of the process. Accordingly, the advantages of the conventional process have been limited from the industrial point of view.

Another conventional method of forming a patterned electro-conductive film on a substrate has been to deposit the film on a substrate by using a metal mask under vacuum deposition conditions. However, when a patterned electro-conductive film is formed on a substrate using the metal mask method, it has been difficult to form precise patterns on the substrates since close contact between the metal mask and the substrate is difficult to achieve. This is especially difficult under high vacuum conditions. A need therefore, exists for a method for forming patterned electro-conductive films on substrates which is accomplished in a few steps in high productivity and with high production efficiency.

SUMMARY OF THE INVENTION

Accordingly, one object of this invention is to provide a method for forming precisely patterned, transparent electro-conductive films on substrates with a procedure which is suitable for mass production.

Another object of this invention is to provide a method for forming transparent, electro-conductive films on substrates coincident with the formation of the film patterns.

Yet another object of this invention is to provide a transparent electrode plate for a liquid crystal display which comprises a patterned electro-conductive film which is stable, has low electrical resistivity and high transmittance.

Briefly, these and other objects of the invention as hereinafter will become readily apparent can be attained by printing a paste in a pattern on portions of a substrate on which the deposition of a transparent electro-conductive film is not desired; depositing a low valence oxide film of an electro-conductive metal oxide on the substrate, heating the resulting substrate in an atmosphere containing oxygen whereby the film is oxidized to form a transparent, highly electro-conductive film on the substrate and the vehicle present in the paste is decomposed.

DETAILED DESCRIPTION OF THE PREFERRED EMBODIMENTS

In the method of this invention, the paste which is printed on portions of a substrate to form a pattern of the area of the substrate on which a transparent electro-conductive film is not desired can be a mixture of 40–80 wt. % of particles of an inorganic oxide and 60–20 wt. % of a vehicle. Suitable inorganic oxide particles used in the invention include refractory and chemically inert inorganic oxides such as titania ($TiO_2$), silica ($SiO_2$), zinc oxide (ZnO), alumina $Al_2O_3$) and the like. The particle diameter of the particles is preferably in the range of 10–0.01 $\mu$.

The vehicle can be a solution prepared by dissolving 0.5–10 wt. % of a resin as a binder in a solvent having relatively high boiling point in order to formulate a paste having a suitable viscosity for printing. It is possible to add less than 0.1 wt. % of a surfactant to improve the printability of the composition. Suitable solvents include amyl acetate, cellosolve acetate, ethyl cellosolve, acetonylacetone, ethyl acetoacetate, ethyl carbitol acetate, butyl carbitol acetate, carbitol acetate, glycol diacetate, diisobutyl ketone, diethyl carbitol, butyl lactate, butyl cellosolve, furfuryl alcohol, benzyl alcohol, and the like. Suitable resins include nitrocellulose, ethyl cellulose, alkyd resin, rosin, cyclized rubber, vinyl chloride, epoxy resin, polyamide, and the like. From the view-point of printability and adhesiveness, the paste is preferably a mixture of 40–70 wt. % of a fine powder of $TiO_2$ and 60–30 wt. % of a solution of 0.5–4 wt. % nitrocellulose in butyl carbitol acetate.

These pastes can be easily printed on a substrate in a predetermined pattern by a screen printing technique. The paste is inert to the substrate as well as the material (low valence oxide) deposited on the substrate. The paste is also easily removed by heating it at temperatures lower than the deformation temperature of the substrate.

A transparent electro-conductive film used for this invention can be obtained by the following process: First, a paste is printed on portions of the substrate which will not be coated with a transparent electro-conductive film by a screen printing technique. Then the printed substrate is dried, for example, at 100° C. to remove the solvent in the paste. The material used in the vacuum deposition step and the substrate which is to be printed with the paste are placed in a vacuum chamber and then the chamber is evacuated. The material is evaporated and deposited on the substrate to form a layer of a low valent metal oxide. The oxide deposited is an oxide of a metal capable of existing in more than one valence state, and when deposited, it is in a lower valence state. Second, the low valence oxide is further oxidized by heating the substrate in an atmosphere containing oxygen, such as air, so that a transparent electro-conductive film is formed, and at the same time, the vehicle present in the paste is decomposed and is removed. The materials which are deposited under vacuum conditions, include those which suitably form transparent electro-conductive metal oxide films by vacuum deposition processes such as indium, tin, zirconium, cadmium, oxides thereof and mixtures thereof.

In order to form a transparent electro-conductive film having good transmittance, electro-conductivity, thermal stability and abrasion resistance, it is preferable to combine indium oxide and tin oxide, or indium metal with tin metal. When both indium oxide and tin oxide are used, the vacuum chamber is evacuated to a pressure of about $10^{-4}$ torr, both indium oxide and tin oxide are simultaneously deposited on the substrate at room temperature. The vaporized indium oxide and tin oxide can be vaporized coincidently from one boat or they can be vaporized separately from two boats.

In the transparent electro-conductive film, the content of tin oxide is preferably in the range of 2-40 wt. %, especially 15-30 wt. %. If the content of tin oxide is less than 2 wt. %, the electro-conductivity is too low, and the thermal stability and abrasion resistance are insufficient. If the tin oxide content is higher than 40 wt. %, the electro-conductivity is greatly decreased. In order to evaporate the low valence oxide under vacuum deposition conditions, the material is heated by a resistance heating technique, an electron-beam heating technique or the like. It is also possible to employ a flash evaporation technique by dropping the low valence oxide material into an incandescent boat or crucible.

The resulting film of the low valence oxide material has strong absorption in the visible region of the spectrum, has less than 20% visible transmittance and has a sheet resistivity of about 1,000 ohms per unit square area. The low valence oxide film is oxidized by heating the resulting film at a temperature greater than 300° C. in an atmosphere containing oxygen such as air, to form a transparent electro-conductive film having low electrical resistivity. At the same time, the vehicle in the paste is decomposed and removed. If the temperature is lower than 300° C., the low valence oxide film is difficult to oxidize, so that a long time is required for the formation of the electro-conductive metal oxide film. If a soda lime silicate glass plate is used as the substrate, and the substrate is heated to a temperature greater than 600° C., the glass plate is deformed. Accordingly, the coated plate is preferably heated in the range of 400° C.-550° C. The temperature required to remove the vehicle from the paste is not critical when the temperature is greater than the decomposition temperature of the vehicle in the paste. When a paste of the previously described composition is used, it is easily decomposed by heating at 350°-550° C.

When a combination of indium metal and tin metal is used as the material deposited under vacuum deposition conditions, the oxygen content of the atmosphere in the vacuum chamber should be well-controlled. For example, the vacuum chamber is maintaind at a pressure of $10^{-3}$-$10^{-4}$ torr, then oxygen is supplied to the chamber from a bomb through a leak valve until the pressure reaches $10^{-2}$-$10^{-3}$ torr. Then, the low valence oxide film is formed on the substrate by reactive evaporation at room temperature. Finally, the product is heated at a temperature higher than 200° C. in an atmosphere containing oxygen such as air, in order to further oxidize the low valence oxide film to form an electro-conductive film having high transmittance, low electrical resistivity and good thermal stability.

In the resulting transparent, electro-conductive film, the content of the tin oxide doped with indium oxide is preferably in the range of 0.1-20 wt. %. If the content of the tin oxide doped with indium oxide is greater than 20 wt. %, the electro-conductivity is insufficient. On the other hand, if the content of the tin oxide is less than 0.1 wt. %, the thermal stability and the abrasion resistance are also insufficient. If the coated substrate is heated at a temperature lower than 200° C., it is difficult to oxidize, thus requiring a long time for the formation of the transparent electro-conductive film. For industrial applications, the coated substrate is preferably heated in the range of 400°-500° C.

Having generally described this invention, a further understanding can be obtained by reference to certain specific examples which are provided herein for purposes of illustration only and are not intended to be limiting unless otherwise specified.

EXAMPLE 1

A paste was printed in a predetermined pattern on portions of a glass plate by a screen printing machine. The paste was prepared by mixing 60 wt. % of a fine powder of $TiO_2$ with 40 wt. % of a solution of 2 wt. % nitrocellulose in butyl carbitol acetate. The glass plate printed with the paste, was dried at 100° C. to completely remove the solvent in the paste. The resulting glass plate was placed in a vacuum chamber and then the chamber was evacuated to $5 \times 10^{-4}$ torr. A mixture of 20 wt. % $SnO_2$ and 80 wt. % $In_2O_3$ was charged into a single boat, and the oxides were evaporated at the same time to deposit a low valence oxide film of $In_2O_3$ doped with 20 wt. % $SnO_2$. Then, the deposited glass plate was heated at 500° C. for 30 minutes to further oxidize the film. The resulting transparent electro-conductive film has a precise pattern and had a film thickness of 800 Å, a visual transmittance of 78%, a surface sheet resistivity of 410 ohms per square area. The vehicle in the paste was decomposed by the heating treatment of leave only the inorganic components on the glass plate. The residual inorganic components were easily removed from the substrate with a soft cloth.

EXAMPLE 2

A predetermined pattern was printed with a paste on portions of a glass plate by a screen printing machine. The paste was composed of 60 wt. % of a fine powder of titanium oxide and 40 wt. % of a solution of 2 wt. % nitrocellulose in butyl carbitol acetate. The glass plate printed with the paste was positioned in a dryer and was kept at 100° C. until the solvent was completely removed. The resulting glass plate was secured in a vacuum chamber and then the chamber was evacuated to a pressure of $5 \times 10^{-4}$ torr. Then, oxygen was supplied to the chamber from a bomb through a leak valve until the pressure reached $5 \times 10^{-3}$ torr. Indium metal and tin metal were deposited on the glass plate at room temperature, from separate evaporation sources, after presetting the evaporation rate of indium to tin at 10:1 by an evaporation rate meter. The resulting deposited film was a dark brown mixture of low valence oxides and was soft enough to be scratched by a nail. Accordingly, it was necessary to heat the treated plate in air at 500° C. for 30 minutes to oxidize the film. The vehicle present in the paste used in the printing was decomposed by the heating treatment to leave only the inorganic components on the glass plate. The residual inorganic components were easily removed from the substrate with a soft cloth, and the precisely patterned, transparent electro-conductive film was obtained. The resulting film had a visual transmittance of 80%, a film thickness of 600 Å and a sheet resistivity of 250 ohms per square area.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A glass substrate having a patterned transparent electroconductive film formed thereon, which coated substrate is used as the electrode plates for liquid crystal display cells, and is prepared by the process, which comprises the steps of:

printing a paste containing a vehicle which easily decomposes at a temperature of 350°–550° C. on a predetermined portion of said glass substrate and drying said paste;

coating said substrate with a low valence metal oxide mixture comprising 85–70 wt. % of $In_2O_3$ and 15–30 wt. % of $SnO_2$ by deposition on said printed substrate in a vacuum to form a transparent electroconductive metal oxide coating; and simultaneously decomposing said vehicle of said paste and oxidizing said low valence metal oxide by heating in the range of 300°–600° C. said coated substrate in an atmosphere containing oxygen.

2. The glass substrate of claim 1, wherein said paste is a mixture of 40–80 wt of inorganic oxide particles and 60–20 wt% of a vehicle.

3. The glass substrate of claim 1, wherein said paste is a mixture of 40–70 wt% of a fine $TiO_2$ powder and 60–30 wt% of a solution of 0.5–4 wt% nitrocellulose in butyl carbitol acetate.

* * * * *